United States Patent [19]

Sato et al.

[11] Patent Number: 5,385,620
[45] Date of Patent: Jan. 31, 1995

[54] PROCESS AND APPARATUS FOR BUILDING A GREEN TIRE

[75] Inventors: Kazuo Sato, Takaishi; Kazuaki Kondo, Toyota, both of Japan

[73] Assignee: Sumitomo Rubber Industries, Ltd., Hyogo, Japan

[21] Appl. No.: 863,299
[22] PCT Filed: Nov. 2, 1990
[86] PCT No.: PCT/JP90/01429
§ 371 Date: Aug. 28, 1992
§ 102(e) Date: Aug. 28, 1992
[87] PCT Pub. No.: WO92/07709
PCT Pub. Date: May 14, 1992
[51] Int. Cl.⁶ .................. B29D 30/32; B29D 30/36
[52] U.S. Cl. .................... 156/131; 156/135; 156/398; 156/415
[58] Field of Search .......... 156/398, 401, 403, 414, 156/415, 416, 131, 132, 135

[56] References Cited

U.S. PATENT DOCUMENTS

| | | |
|---|---|---|
| 3,409,491 | 11/1968 | Pacciarini et al. .......... 156/415 |
| 3,434,897 | 3/1969 | Caretta et al. . |
| 3,694,290 | 9/1972 | Pacciarini et al. .......... 156/401 |
| 3,867,230 | 2/1975 | VanHorn et al. . |
| 4,780,170 | 10/1988 | Landsness ................. 156/415 |

FOREIGN PATENT DOCUMENTS

| | | |
|---|---|---|
| 0081858 | 6/1983 | European Pat. Off. . |
| 134083 | 10/1975 | Japan . |
| 116630 | 7/1982 | Japan . |
| 198334 | 8/1989 | Japan . |

Primary Examiner—Geoffrey L. Knable

[57] ABSTRACT

A process and apparatus for building a green tire. The process includes mounting a carcass, in the form of a cylinder, around a green tire building machine having left and right shoulder formers with radially expandable bead locking mechanisms. The left and the right shoulder formers are each moved together into an idle movable state where the shoulder formers are allowed to move freely in an axial direction either closer or farther from each other. The bead locking mechanisms are radially expanded so as to lock the beads in a set position on the outer circumferential surface of the carcass outside the respective bead locking mechanism. Once the beads are locked, each of the shoulder formers are placed in a driven movable state for driving the respective shoulder formers toward each other thereby narrowing the distance between the beads so as to shape the carcass into a toroidal form.

8 Claims, 8 Drawing Sheets

PROCESS AND APPARATUS FOR BUILDING A GREEN TIRE

BACKGROUND OF THE INVENTION

The present invention relates to a process and an apparatus for building a green tire in a process for producing a radial tire.

Conventional methods have been developed for building a green tire.

Firstly, a tire carcass is wound on a tire shaping former including right and left shoulder formers, and formed into a cylindrical shape. Then, beads are set in specified positions on the tire carcass. In this state, bead locking mechanism provided in the respective shoulder formers are expanded in a radial direction of the shaping former, whereby the beads are locked in the tire carcass. Subsequently, while the shaping air is supplied to inflate the tire carcass, the left and the right shoulder formers are moved closer to each other by a driving mechanism, narrowing the distance between the beads. In this way, the tire carcass is shaped into a toroidal form. Thereafter, opposite side portions of the tire carcass are turned up around the respective beads. Consequently, a breaker and a tread are further applied onto an outer circumferential surface of the tire carcass, whereby a green tire is completely built.

For carrying out the above process, an apparatus is used having a main shaft supported by a housing rotatably and movably in an axial direction thereof, and a countershaft (sleeve) externally fitted to the main shaft and being rotatable together with the main shaft and movable in an axial direction thereof relative to the main shaft. The apparatus also includes left and right shoulder formers fixed to forward ends of the main shaft and the countershaft, each shoulder former being provided with radially expandable bead locking mechanism and inflatable ply turn-up device. A pair of ladder-shaped screw shafts, angular screw shafts, or ball screws, each having a left-handed screw portion and a right-handed screw portion, are rotatably supported by the shoulder formers in parallel to the main shaft. A member provided with holes having internal right-hand screw threads on opposite sides thereof are connected to the screw shafts and the countershaft in the following fashion. The holes of the member are spirally fitted to the right-hand screw portions of the respective screw shafts. A center portion of the member is so connected to a rearward end of the countershaft as to render the countershaft rotatable and slidable. In addition, a member provided with holes having internal left-hand screw threads on opposite sides thereof is connected to the screw shafts and the main shaft in the following fashion. The holes of the member are spirally fitted to the left-hand screw portions of the respective screw shafts. A center portion of the member is so connected to a rearward end of the main shaft as to render the main shaft rotatable and slidable. The screw shafts are coupled to a motor. By reciprocatingly rotating the screw shafts by the motor, the main shaft and the countershaft can be moved in the axial direction thereof relative to each other. Accordingly, the shoulder formers fixed respectively to the main shaft and the countershaft can be moved closer to or away from each other. In other words, in this apparatus, the driving force of a drive source, such as a motor, is transmitted respectively to the main shaft and the countershaft through a desired driving force transmission mechanism, whereby the main shaft and the countershaft are moved closer to and away from each other.

However, in the above process and apparatus, the left and the right shoulder formers are coupled to the driving mechanism through the main shaft or the countershaft respectively. Unless driven by the driving mechanism, the shoulder formers are in almost completely fixed states respectively. Accordingly, the following problems occur.

FIG. 7(a) shows the state of an over hanging carcass ply C mounted on a turn-up bladder (ply turning up bladder) 63. In this state, left and right shoulder formers on which the carcass ply C is wound (only one of the shoulder formers 70 is shown in FIG. 7(a)) are fixed, and therefore the distance between the two shoulder formers is unchangeable.

FIG. 7(b) illustrates the state of the device when bead locking segment 64a (Serving as a bead locking mechanism) is radially expanded. As the carcass ply C is pushed radially outward, a portion of the carcass ply C is lifted from a point P serving as a starting point. Accordingly, cords of the carcass ply C are elongated a distance obtained by subtracting a length (L1+l1) as shown in FIG. 7(a) from another length (L2+l2 as shown in FIG. 7(b). Such elongation of the cords can be compensated by displacement of an end of the ply from a position E to a position E'. Alternatively, the elongation of the cords can be compensated by displacement of a point P' shown in FIG. 7(b) to the point P. These two types of cord displacement occur at different ratios. This causes variation in the lengths of the carcass ply cords between the beads adversely affecting uniformity of the tire.

Further, displacing the end of the ply from the position E to the position E' cause the cord angle constituting a bead reinforcing layer with respect to its lengthwise direction to increase. This in turn causes the angles of the carcass ply cords with respect to a circumferential direction of the carcass ply to become greater, again adversely affecting the tire uniformity. Moreover, displacing the end of the ply from the position E to the position E' causes great tension be exerted onto the carcass ply cords thereby reducing the amount Tat topping rubber of a portion U of the carcass ply C immediately adjacent the bead B. In this state, the bead and the ply cords are liable to be abraded one against another.

Furthermore, in the above process and apparatus, when the left and the right shoulder formers are driven for moving them closer to each other in the carcass shaping operation, it is extremely difficult to start driving the left and the right shoulder formers in perfect synchronization with the start of the supply of the shaping air. If the shoulder formers are driven after the start of the supply of the shaping air, the carcass ply C is pulled excessively by the shaping air causing the bead on the carcass ply C to dislocate from set positions thereof. Accordingly, there is a greater likelihood that the lengths of the turned up ply and the distance between the beads will vary. On the contrary, if the shoulder formers are driven before the start of the supply of the shaping air, problems such as flapping of the carcass ply occur during the carcass shaping operation.

DISCLOSURE OF THE INVENTION

In order to solve the foregoing problems with conventional methods and apparatus, the present invention is constructed as herein after described.

A first green tire building process according to one embodiment of the invention includes the steps of forming a carcass in the form of a cylinder on a green tire building machines including left and right shoulder formers, each shoulder former having a radially expandable bead locking mechanism bringing the left and the right shoulder formers into respective idle and movable state where the shoulder formers can move freely-toward or away from each other by disengaging a clutch included in a drive mechanism for driving the left and the right shoulder formers, radially expanding the bead locking mechanism included in the respective shoulder formers while in the idle and movable state so as to lock beads set in specified positions on an outer circumferential surface of the carcass outside the respective bead locking mechanism, bringing the shoulder formers into respective driving movable states by engaging the clutch included in the drive mechanism driving the respective shoulder formers toward each other, narrowing the distance between the beads, so as to shape the carcass into a toroidal form, turning up opposite side portions of the carcass around the respective beads, and adhering tire components, such as a breaker and a tread, onto the outer circumferential surface of the carcass.

According to the above process, the left and the right shoulder formers are brought into respective idle put movable states when the beads are to be locked. Thereby, the left and the right shoulder formers are moved toward each other slightly spontaneously following the radial expansion of the bead locking mechanism, slightly narrowing the distance between the beads. Thus, the strong force exerted on the carcass cords associated with conventional methods is relieved.

Further, according to a second embodiment of a green tire building process according to the present invention, the left and the right shoulder formers are kept in the respective idle and movable states from the start of the bead locking operation to a predetermined stage of the carcass shaping operation by keeping a clutch of the drive mechanism for driving the shoulder formers in a disengaged state.

More specifically, using the above process, when the carcass is radially inflated from the pressure of the shaping air in the carcass shaping operation, the left and the right shoulder formers synchronously start moving toward each other. Thereafter, the shoulder formers move further closer to each other in response to the inflation of the carcass. After the predetermined stage of the carcass shaping operation, e.g. an intermediate stage thereof or a stage where the carcass is shaped into a substantially semicircular form, the clutch is engaged so as to drive the shoulder formers toward each other in accordance with the form of the carcass. Consequently, the beads are moved to their respective specified final positions, and the carcass is shaped into a toroidal form, completing the carcass shaping operation. Thereafter, opposite side portions of the carcass outside the respective beads are turned up around the beads, and tire components such as a breaker and a tread are adhered onto the carcass. In this way, a green tire can be built.

The present invention also includes an apparatus for performing the above described processes. The inventive apparatus includes a housing, a main shaft having a forward end with one side of which is rotatably supported by the housing, a countershaft disposed coaxially with the main shaft, the countershaft being movable relative to the main shaft in an axial direction of the main shaft and rotatable integrally with the main shaft, left and right shoulder formers mounted respectively on the forward end of the main shaft and the countershaft, each of the shoulder formers having radially expandable bed locking mechanism, drive mechanism for moving the main shaft and the countershaft relative to each other in the axial direction thereof, and a switch mechanism for interchangeably moving between an operative state of the drive mechanism from a driving state where the driving force is applied to the main shaft and the countershaft and an idle state where the main shaft and the countershaft are allowed to move freely.

With the above construction, by changing the operative state of the switch mechanism to the driving state, the left and the right shoulder formers can be driven to move in the axial direction. In addition, by changing the operation state of the switch mechanism to the idle state, the left and the right shoulder formers can be kept in respective idle movable states during the bead locking operation and/or from the state of the carcass shaping operation to the predetermined stage thereof. By changing the operative state of the switch means in an appropriate manner, the aforementioned process can be carried out.

DETAILED EXPLANATION OF THE PREFERRED EMBODIMENTS

An embodiment of the present invention will be described with reference to FIGS. 1 to 5.

Figure 1:
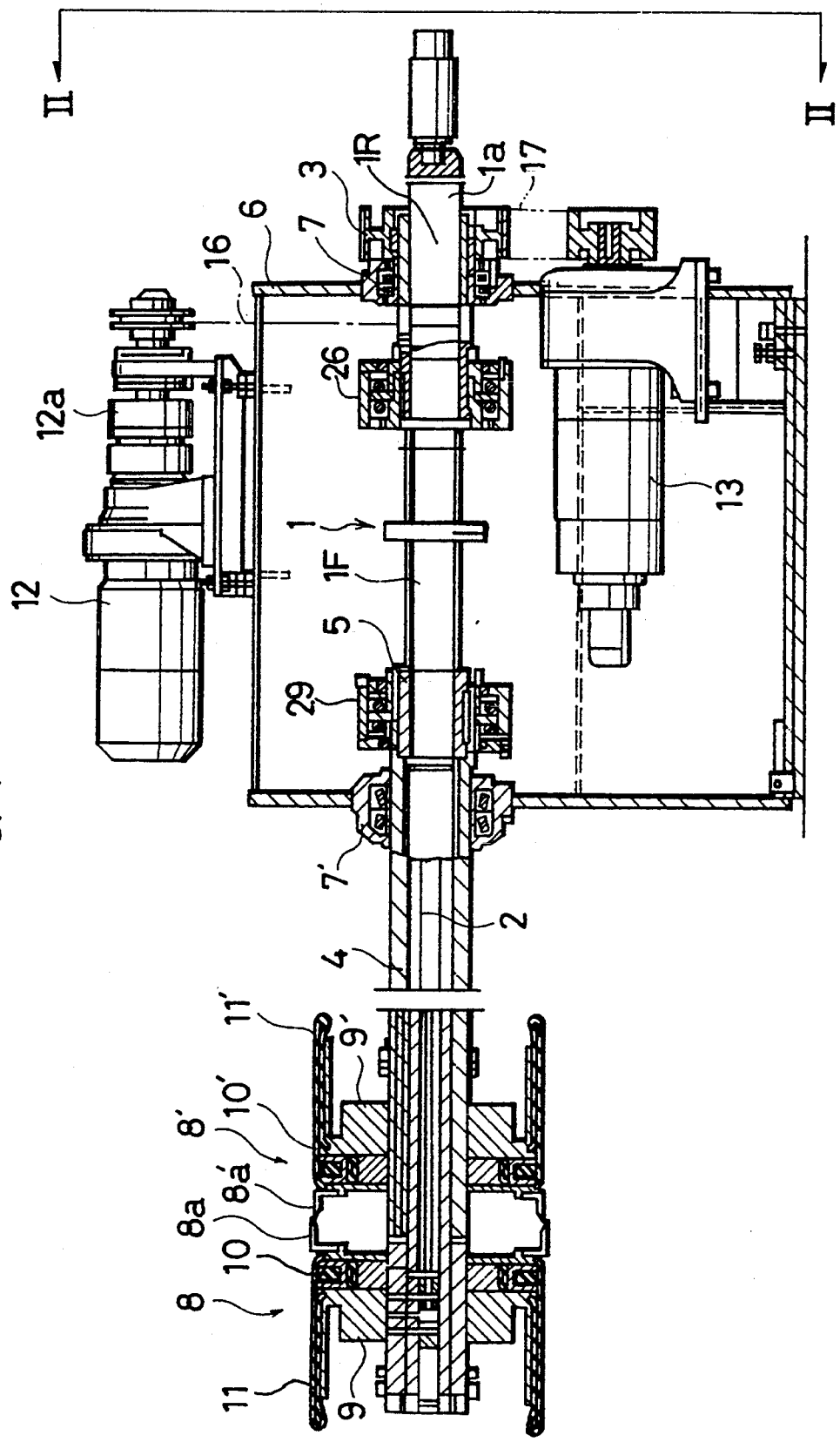
FIG. 1 is a sectional side elevation showing a green tire building apparatus embodying the invention.
Figure 2:
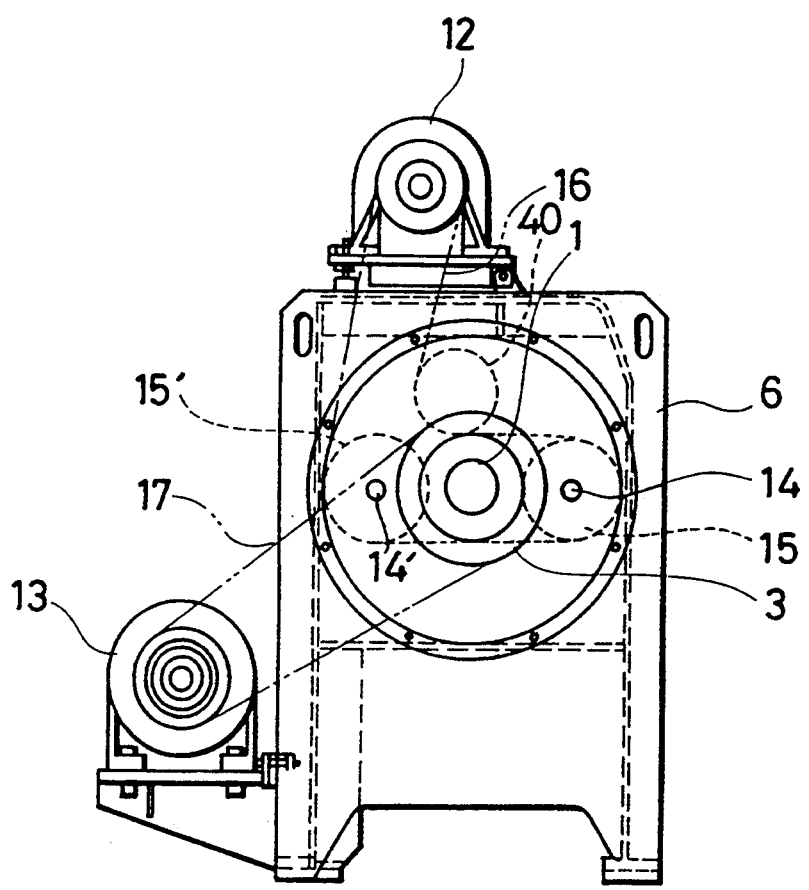
FIG. 2 is a diagram showing the building apparatus viewed from a direction of an arrow II in FIG. 1.
Figure 3:
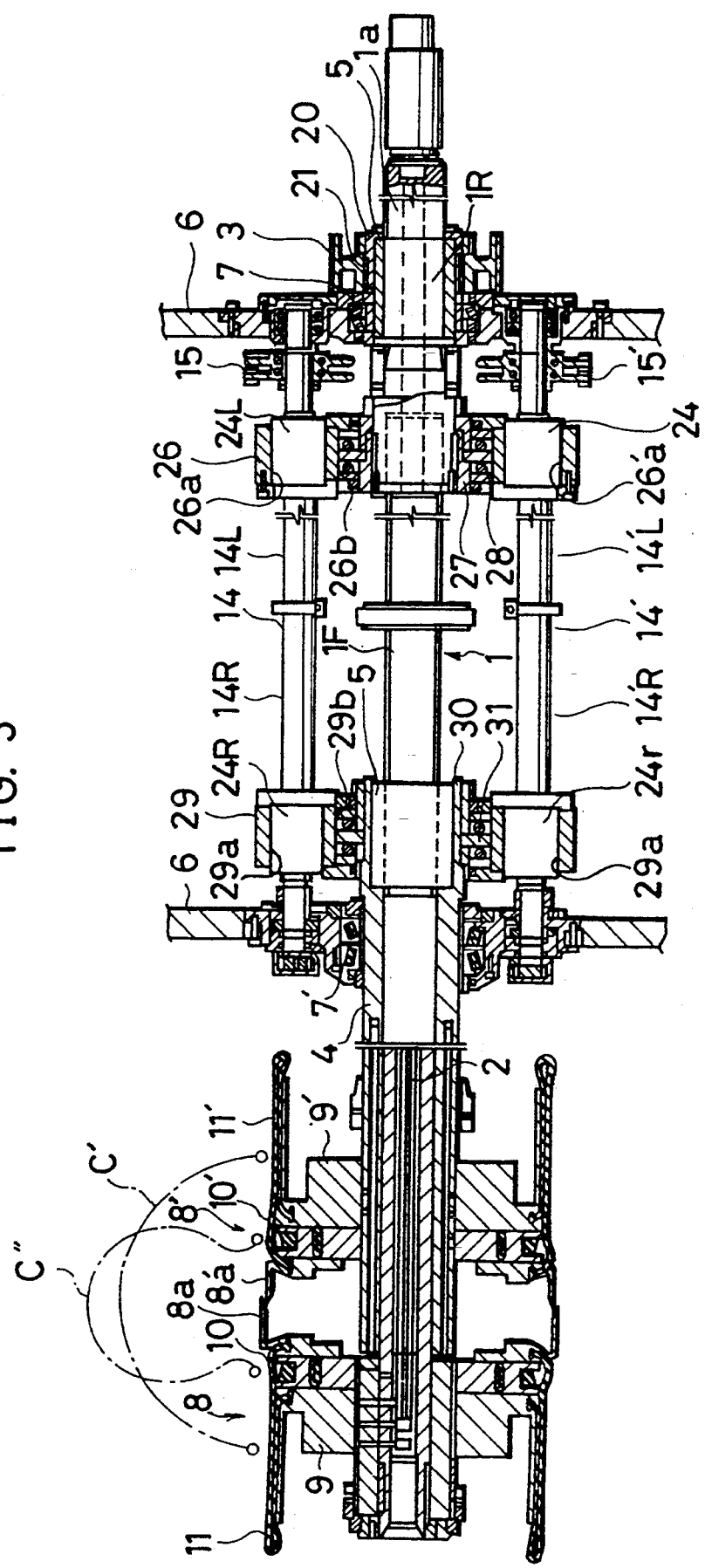
FIG. 3 is a section plan view showing a construction around a main shaft of the building apparatus.
Figure 4:
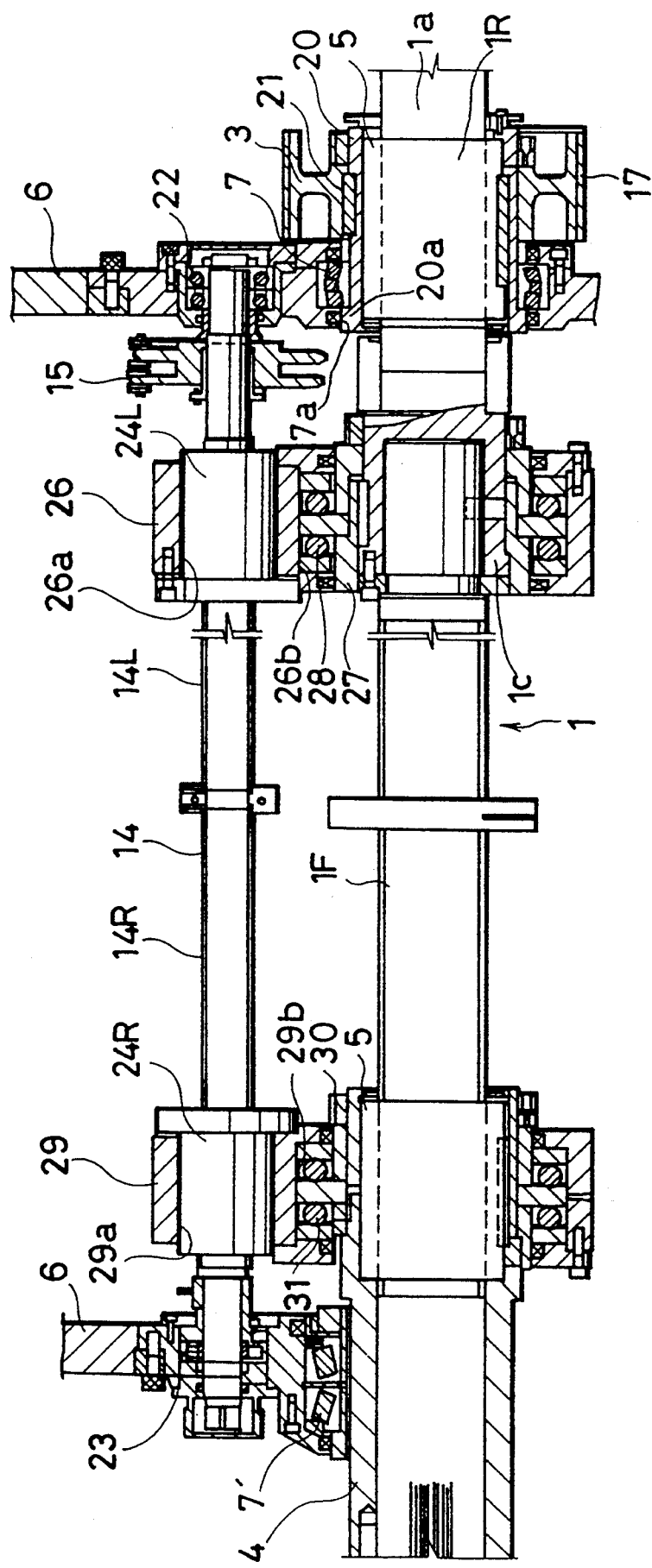
FIG. 4 is a sectional plan view showing a driving section of the building apparatus.
Figure 5:
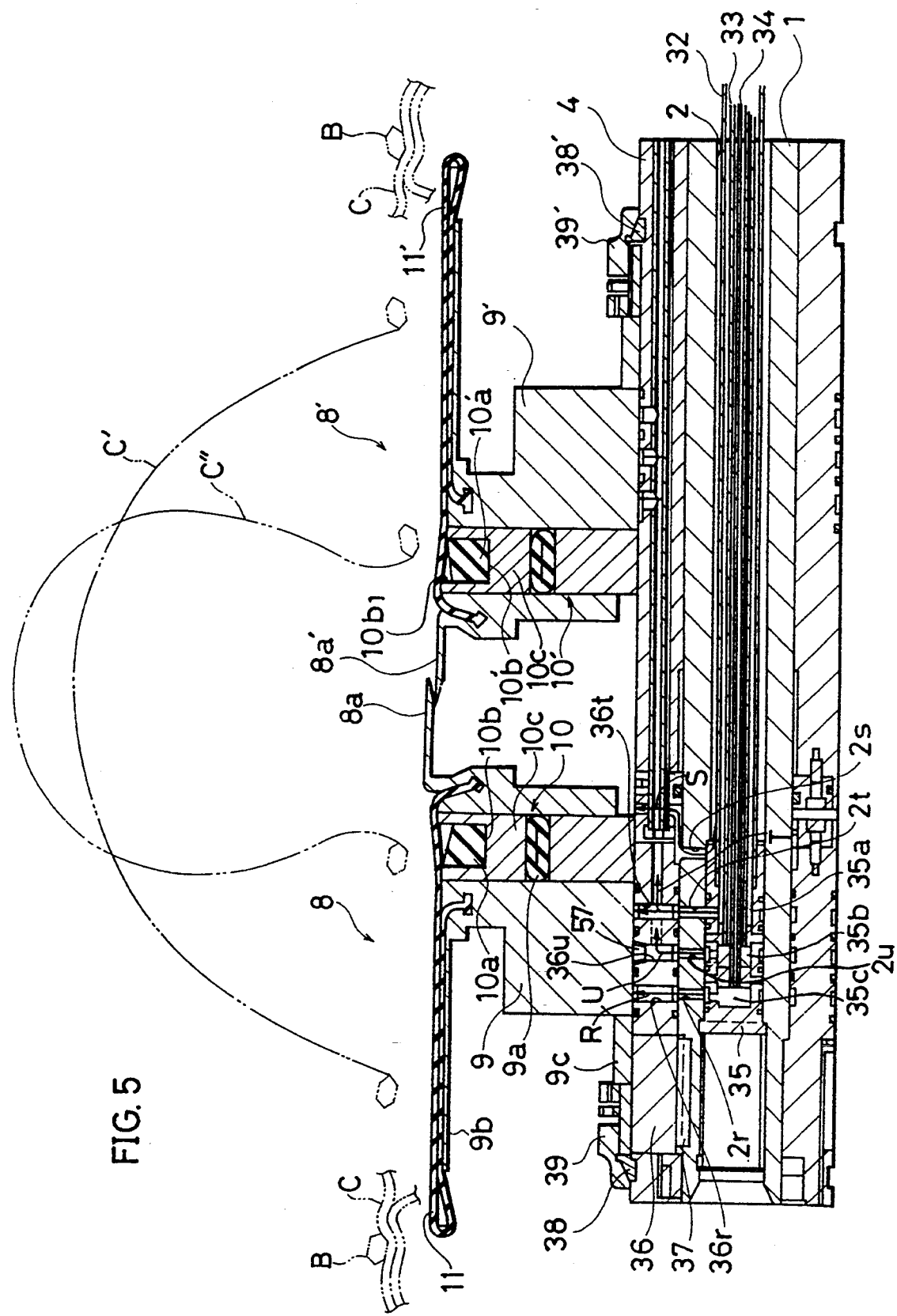
FIG. 5 is a sectional side elevation showing a green tire shaping section of the building apparatus.

A green tire building apparatus shown in the figures generally includes a driving section shown in FIGS. 1-4, and a green tire shaping section shown in FIGS. 1, 3 and 5.

The driving section is provided with a housing 6 that rotatably supports one side of a main shaft 1 and a countershaft (sleeve) 4.

Specifically, the main shaft 1 comprises a forward main shaft 1F and a rearward main shaft 1R. The forward main shaft 1F and the rearward main shaft 1R are connected to each other at a juncture portion 1c, see FIG. 4. A rear end of the main shaft 1 (a right end thereof in FIG. 4) is a splined shaft 1a. The countershaft 4 is externally fitted to the forward main shaft 1F by way of a ball spline 5. The countershaft 4 is movable in an axial direction thereof relative to the main shaft 1, and rotatable together therewith. A radial roller bearing 7' is fixedly provided on a front side wall of the housing 6 (a left side wall thereof in FIG. 1.) The countershaft 4 is made not only rotatable and but also slidable in the axial direction by being supported by a bearing having a small frictional resistance provided on an inner circumferential surface of the radial roller bearing 7'. More particularly, the countershaft 4 is capable of sliding freely and smoothly when subjected to even a small force in the axial direction.

A boss 20 internally provided with ball spline 5 is externally fitted to the splined shaft 1a of the main shaft 1. The boss 20 has a jaw 20a formed on an end portion thereof (see FIG. 4.) A radial roller bearing 7 is fixedly provided on a rear side wall of the housing 6. The boss 20 is internally fitted to the radial roller bearing 7. On the radial roller bearing 7 is formed a groove 7a, which is in engagement with the jaw 20a. If constructed as described above, the main shaft 1 can be supported by the housing 6 rotatably and movably in the axial direction thereof. That is to say, the main shaft is capable of sliding freely and smoothly when subjected to even a small force in the axial direction.

To the boss 20 is fixed a pulley 3 through a key 21. On a bottom portion of the housing 6 is provided a motor 13 including a speed reducer. An output shaft of the motor 13 is coupled to the pulley 3 through a belt 17. Upon actuating the motor 13, the main shaft 1 and the countershaft 4 are drivingly rotated.

In the housing 6, ball screws 14, 14' are disposed horizontally in parallel to the main shaft 1. Opposite ends of the respective ball screws 14, 14' are rotatably supported by the housing 6 through rolling bearings 22, 23, see FIG. 4.

A forward half of the ball screws 14 is a right-hand screw 14R (a left half of the ball screw 14 in FIGS. 1, 3,) and a rear half thereof is a left-hand screw 14L (a right half thereof in FIGS. 1, 3.) Similarly, a forward half of the ball screw 14' is a right-hand screw 14'R, and a rear half thereof is a left-hand screw 14'L. Right-hand screw nuts 24R, 24'R are spirally fitted to the right-hand screw 14R, 14'R respectively. Similarly, left-hand screw nuts 24L, 24'L are spirally fitted to the left-hand screw 14L, 14'L respectively.

On the other hand, bosses 30, 27 are externally fixedly fitted to a specified portion of the countershaft 4 located inside the housing 6 and the juncture portion 1c of the main shaft 1 respectively. Around the bosses 30, 27 are disposed thrust members 29, 26 extending in radial directions of the main shaft 1. More specifically, the respective thrust members 29, 26 have openings 29b, 26b defined in the center thereof. The openings 29b, 26b have respective radii larger than those of the bosses 30, 27 respectively. Between the inner circumferential surfaces of the openings 29b, 26b and the outer circumferential surfaces of the bosses 30, 27 are provided thrust bearings 31, 28 respectively. Having the construction as described above, the main shaft 1 and the countershaft 4 are rotatable relative to the thrust members 29, 26 respectively, and move together with the respective thrust members 26, 29 in the shaft direction.

The thrust members 29, 26 are further provided with openings 29a, 29'a, and openings 26a, 26'a on opposite end portions thereof respectively. The openings 29a, 29'a are arranged horizontally and interposing with the opening 29b. Similarly, the openings 26a, 26'a are arranged horizontally and interposing with the opening 26b. To the openings 29a, 26a are fixedly fitted the right-hand screw nut 24R and the left-hand screw nut 24L respectively. To the openings 29'a, 26'a are fixedly fitted the right-hand screw nut 24'R and the left-hand screw nut 24'L respectively. That is to say, the countershaft 4 is coupled to the right-hand screw nuts 24R, 24'R through the thrust member 29, and moves together with the right-hand screw nuts 24R, 24'R and the thrust member 29. On the other hand, the main shaft 1 is coupled to the left-hand screw nuts 24L, 24'L through the thrust member 26, and moves together with the left-hand screw nuts 24L, 24'L and the thrust member 26

Further, sprockets 15, 15' are respectively fixed on the circumferential surfaces of the ball screws 14, 14' at a portion close to an interior side wall of the housing 6. On a top wall of the housing 6 is mounted a motor 12 including a speed reducer (ball screw drive mechanism) provided with a clutch 12a (switch mechanism.) A single chain 16 is wound on an output shaft of the motor 12 and the sprockets 15, 15' as shown in FIG. 2. Upon engaging the clutch 12a, the driving force of the motor 12 is transmitted to the ball screws 14, 14' through the chain 16 and the sprockets 15, 15', whereby the ball screws 14, 14' are driven to rotate. With the clutch 12a disengaged, the ball screws 14, 14' are allowed to rotate freely even if subjected to even a small force. More specifically, in this state, the sprockets are capable of rotating without any restraint. Accordingly, when a left shoulder former 8 mounted on a forward end of the main shaft 1 and a right shoulder former 8' mounted on a forward end of the countershaft 4 are moved closer to or away from each other in the axial direction thereof the screw nuts 24L, 24'L, and 24R, 24'R slide on the ball screws 14, 14' through the bosses 27, 30, and the thrust members 26, 29 move closer to or away from each other correspondingly in response to movement of the shoulder formers 8, 8' with almost no resistance.

Indicated at 40 in FIG. 2 is a tension roller pressed against the chain 16.

Next, there will be described a green tire shaping section of this apparatus.

A circular hole (shaping air supply passage) 2 is defined in the center of the main shaft 1, the hole extending in the axial direction of the main shaft 1. As shown in FIG. 5, inside the shaping air supply passage 2 is inserted a bead locking air pipe 32 for supplying the air to be used to lock the bead. Further inside the shaping air supply passage 2 is inserted a right turn-up bladder air pipe 33 for supplying the air to inflate a right turn-up bladder. Still further inside the shaping air supply passage 2 is inserted a left turn-up bladder air pipe 34 for supplying the air to inflate a left turn-up bladder. A forward end of the right turn-up bladder air pipe 33 extends forwardly of that of the bead locking air pipe 32. A forward end of the left turn-up bladder air pipe 34 extends forwardly of that of the right turn-up bladder air pipe 33.

Further, to an forward end of the shaping air supply passage 2 defined in the main shaft 1 is spirally inserted an end plug 35 having air chambers 35a, 35b, and 35c. A main shaft sleeve 36 is externally fitted to the forward end of the main shaft 1 and integrally fixed with the main shaft 1 by a key 37. The forward ends of the air pipes 32, 33, and 34 are respectively connected to the air chambers 35a, 35b, and 35c. Also, air communicating holes 2s, 2t, 2u, and 2r are defined in the main shaft 1 with respectively extending in radial directions of the main shaft 1. The air communicating hole 2s is adapted for communicating air from the shaping air supply passage 2 with the outside of the main shaft 1. The air communicating hole 2t is adapted for communicating air from the air chamber 35a with the outside of the main shaft 1. The air communicating hole 2u is adapted for communicating air from the air chamber 35b with the outside of the main shaft 1. The air communicating hole 2r is adapted for communicating air from the air chamber 35c with the outside of the main shaft 1. Air communicating holes 36t, 36u, and 36r, which are in register with the air communicating holes 2t, 2u, and 2r, are defined in the main shaft sleeve 36 with respectively extending in radial directions of the sleeve 36.

Over an entire circumferential surface of the forward end portion (the left end portion in FIG. 5) of the main shaft 1 is provided a left shoulder former 8. Over an entire circumferential surface of the forward end portion of the countershaft 4 is provided a right shoulder former 8' arranged on the counterssshaft 4 to oppose the left shoulder former 8.

The left and the right shoulder formers 8, 8' respectively comprise support rings 9, 9'. Inside the support rings 9, 9' with respect to the axial direction are respectively formed cylinder bodies 8a, 8'a engageable with each other moved closer together. These cylinder bodies 8a, 8'a are adapted for forming a cylindrical surface having a required former width in a carcass forming operation, and for diminishing the former width by engaging each other in a carcass shaping operation, thereby narrowing the distance between a right bead and a left bead set on the carcass.

Hereafter, a description is made of the left shoulder former 8. The support ring 9 is externally fitted to the main shaft sleeve 36. A bottom plate 9c of the support ring 9 is fixed to the main shaft sleeve 36 by a key 38. Further, a ring nut 39 is spirally fitted to an end 9c of the bottom plate 9, whereby the support ring 9 is integrally fixed to the forward end of the main shaft 1.

On the circumferential surface of the support ring 9 is formed a groove that opens radially outward (upward in FIG. 5.) An annular rubber bag 9a is accommodated in this groove. Further outward of the rubber bag 9a, a plurality locking segments 10c, 10'c are mounted and aligned in a circumferential direction of the apparatus. These bead locking segments 10c, 10'c collectively form an annular body. Each bead locking segment 10c, 10'c is provided with a fitting portion 10b, 10'b open radially outward. The fitting portions 10b, 10'b collectively form an annular groove, in which a rubber solid bands 10a, 10'e is fitted. The rubber solid bands 10a, 10'a the bead locking segments 10c, 10'c and the rubber bags 9a, 9'a constitute the bead locking mechanism 10, 10'. When being compressingly supplied with the air, the rubber bags 9a, 9'a are inflated to push the bead locking segments 10c, 10'c radially outward. In this way, the overall bead locking mechanism is capable of expanding radially outward.

The mechanism for pushing the respective bead locking segments 10c, 10'c radially outward is not limited to a rubber bag as described above. It is, for example, possible to drive the respective bead locking segments 10c, 10'c radially outwardly through the use of a link mechanism. Specifically, the bead locking mechanism is provided with an air cylinder actuatable in an axial direction of the left and the right shoulder former 8, 8'. A piston provided in the air cylinder is coupled to the bead locking segments 10c, 10'c respectively through links. An axial movement of the piston is converted to radially outward movements of the respective bead locking segments 10c, 10'c through the respective links. Thus the respective bead locking segments can be driven simultaneously.

Radially outwardly of the bead locking segments 10c, 10'c is disposed turn-up bladders 11, 11'. An inner end and an outer end of each turn-up bladders 11, 11' are respectively fixed to specified positions on an outer circumferential surface of the support rings 9, 9'. The turn-up blanders 10, 10' are sealed, so that the interior thereof is completely separated from the exterior thereof. Further, at an outer side face of the support ring 9 with respect to an axial direction thereof is provided support plates 9b, 9'b for supporting the turn-up blanders 11, 11' from the radially inward directions, the support plates 9b, 9'b extra along the axial direction.

With this construction, shaping air sent between the shaping air supply passage 2 defined in the main shaft 1 and the bead locking air pipe 32 is supplied to the inside of a carcass ply C to be described in detail below in the following manner. The shaping air is firstly passed through the air communicating hole 2s defined in the main shaft 1 and then through a clearance between the main shaft sleeve 36 and the countershaft 4 as shown by an arrow S in FIG. 5. Through a longitudinal hole formed between the cylinder bodies 8, 8', the shaping air is consequently supplied to the inside of the carcass ply C disposed outside of the cylinder bodies 8, 8'.

Further, air sent through the bead locking air pipe 32 is supplied from air from the air chamber 35a defined in the end plug 35 through the air communicating holes 2t, 36t to the inside of the rubber bag 9a as shown by an arrow T in FIG. 5, and thereby inflating the rubber bag 9a.

Moreover, the air sent through the turn-up bladder air pipes 33 is supplied from air from the air chambers 35b through the air communicating holes 2u, 36u to the inside of the right turn-up bladder 11' as shown by an arrow U in FIG. 5, and thereby inflating the right turn-up bladder 11'. Similarly, the air sent through the turn-up bladder air pipes 34 is supplied from air from the air chambers 35c through the air communicating holes 2r, 36r to the inside of the left turn-up bladder 11 as shown by an arrow R in FIG. 5, and thereby inflating the left turn-up bladder 11.

Figure 6:
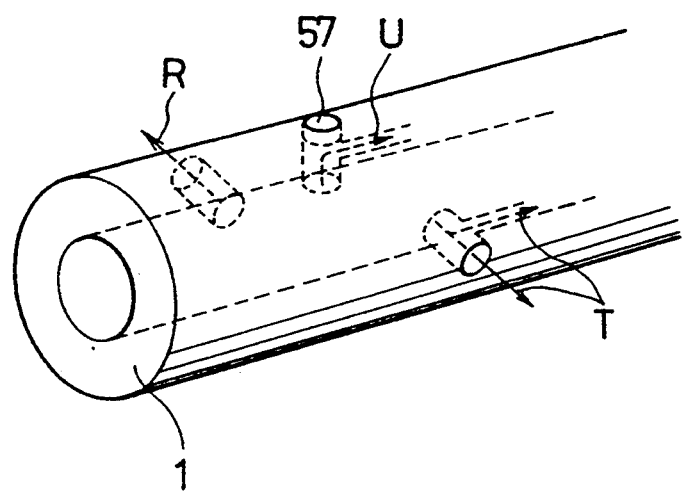
FIG. 6 is a perspective view showing various air passages provided in the building apparatus.
Figure 7A:
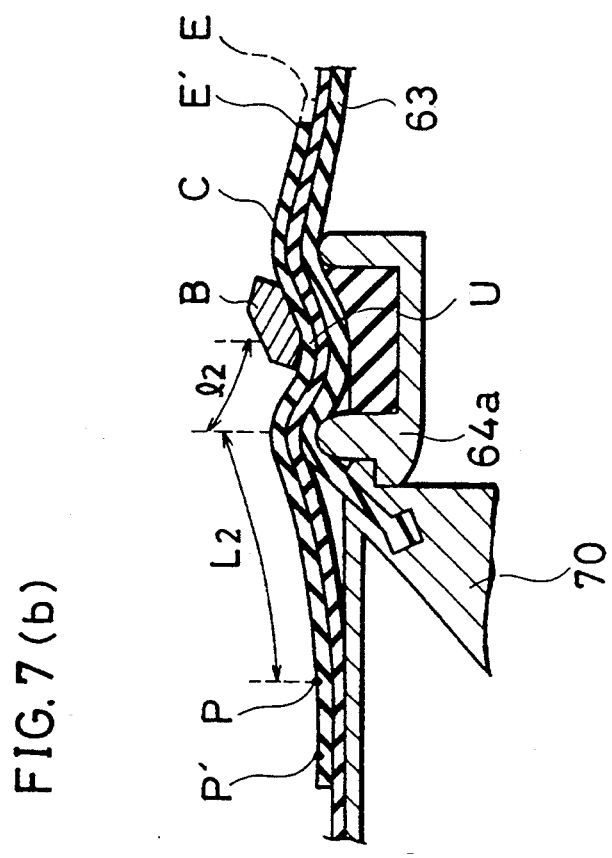
FIGS. 7(a), 7(b) are sectional views respectively showing problems when a bead is to be locked in a green tire building apparatus of prior art.
Figure 7B:
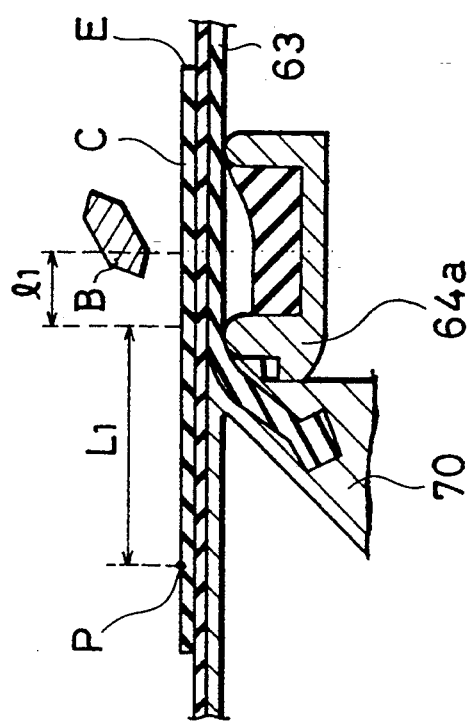

Indicated at 57 in FIGS. 5 and 6 is a plug.

The respective air communicating paths described hereinbelow can be summarized as follows:

a) Shaping air: shaping supply passage 2—>> air communicating hole 2s—>> an arrow S—>> inside of formers.

b) bead locking air: bead locking air pipe 32—>> air chamber 35a—>> air communicating hole 2t—>> air communicating hole 36t—>> left or right bead locking mechanism c) right turn-up bladder air: turn-up bladder air pipe 33—>> air chamber 35b—>> air communicating hole 2u—>> air communicating hole 36u—>> inside of right turn-up bladder 11'.

d) left turn-up bladder air: turn-up bladder air pipe 34—>> air chamber 35c—>> air communicating hole 2r—>> air communicating hole 36r—>> inside of left turn-up bladder 11. The right shoulder former 8' is identical to the left shoulder former 8 in its construction and operation except that the right shoulder former 8' is fixed to the countershaft 4 in a symmetrical relationship to the left shoulder former 8 along a longitudinal plane located midway between the right and left shoulder formers 8, 8'. Accordingly, identical parts are designated with dashed same numerals. Thus in some instance, a detailed description thereof has been omitted.

Next, there will be described a green tire building process as employed using the above constructed apparatus.

(a) At the point when a preceding tire building operation is completed, the left and the right shoulder formers 8, 8' are held close to each other as shown in FIG. 5. The clutch 12a is then engaged so as to bring each of the ball screws 14, 14' into a driven rotatable state In this state, the motor 12 including a speed reducer is actuated to driven the rotation of the ball screws 14, 14' through the chain 16, and the sprockets 16, 16', whereby the thrust members 26, 29 are respectively moved in toward each other. The main shaft 1 and the countershaft 4, fixed relative to the thrust members 26 and 29, are moved in the axial direction thereof corresponding to movements of the thrust members 26, 29. This in turn causes the left and the right shoulder formers 8, 8' respectively fixed to the main shaft i and the countershaft 4 to move away from each other along the axial direction. Upon the left and the right shoulder formers 8, 8' reaching respective fully open positions defining therebetween a width necessary for building a green tire, the motor 12 deenergized.

(b) A band fabricated in advance by a band forming apparatus, i.e., a cylindrical carcass C without a bead, is wound on a rigid cylindrical surface formed by the left and the right shoulder formers 8, 8' in the respective fully open positions thereof. It should be noted that a procedure for forming the carcass C is not limited discussed herein. Accordingly, the carcass C may be formed by adhering carcass components onto the cylindrical surface one over another.

(c) left and right beads B as shown in FIG. 5 are held by left and right bead setters respectively, (not shown) and their moved respective locking positions immediately outside the bead locking segments 10c, 10'c respectively in the left and the right shoulder formers 8, 8'. Upon their beads stopping at the respective locking positions, the clutch 12a of the motor 12 is disengaged, which in turn brings the ball screws 14, 14' into an idle rotatable state respectively. Thereby, the thrust members 26, 29, the main shaft 1, the countershaft 4, and the left and the right shoulder formers 8, 8' are induced to move freely in the axial direction if subjected to even weak force.

(d) After a lapse of a predetermined period of time, air is supplied to the rubber bags 9a, 9'a through the bead locking air pipe 32 within the main shaft 1 (see the arrow T). Thereby, the rubber bag 9a is inflated to push the bead locking segments 10c, 10'c radially outward. These bead locking segments 10c, 10'c project radially outward pushing the carcass C in a similar manner so as to completely hold the left and the right beads B on the carcass C as shown by the phantom lines in FIG. 5. In this way, the bead locking operation is completed, and simultaneously the left and the right bead setters are returned to standby positions.

When the beads B are to be locked, the carcass C is lifted by the radially outward projection of the bead locking segments 10c, 10'c. However, since the clutch 12a of the motor 12 is disengaged and the screws in use are ball screws, the main shaft 1 and the countershaft 4 become slidable along the axial direction thereof through the ball spline 5. Further, the main shaft 1 and the housing 6 become slidable along the axial direction of the main shaft 1 through another ball spline 5. Accordingly, the left and the right shoulder formers 8, 8' are slightly moved in directions so as to be closer to each other along the axial direction of the main shaft 1 and the countershaft 4 with almost no resistance and, following the radially outward expansion of the carcass C. Therefore, the carcass C is not subjected to unnaturally strong force.

(e) A tread/belt assembly is held by an belt transferring apparatus(not shown). The belt transferring apparatus is advanced up to a position outside of a center portion between the left and the right shoulder formers 8, 8'. The belt transferring apparatus is stopped and waits in standby position.

(f) After a lapse of a predetermined period of time, the shaping supplied to the inside of the carcass C positioned between the left and the right shoulder formers 8, 8' through the shaping air supply passage 2 defined in the main shaft 1 with the clutch 12a being still disengaged. Upon receipt of the shaping air from inside, the carcass C starts inflating radially outward. Synchronized with the start of the supply of shaping air, the left and the right shoulder formers 8, 8' supporting opposite sides of the carcass C through the beads B, are pulled and moved uniformly in directions so as to be closer to each other in response to the tension created from inflation of the carcass C with almost no resistance.

(g) At a stage where the carcass C is shaped into a form represented by C' in FIG. 5 only by the tension created from expansion of the carcass C, the clutch 12a of the motor 12 is engaged, whereby the ball screws 14, 14' are driven to rotate. This causes the left and the right shoulder formers 8, 8' to move further closer to each other, and continues a forcible shaping of the carcass C by driving the motor. Consequently, the left and the right shoulder formers 8, 8' are moved to predetermined positions as shown in FIG. 5. In this state, the carcass C is inflated into a toroidal form, as represented by C'' in FIG. 5, by the shaping air continually supplied to the inside thereof, completing the shaping operation.

For setting the engagement timing of the clutch 12a, for example, a limit switch may be provided in a specified position along a moving path of the right shoulder former 8'. The clutch 12a may be designed to be disengaged upon the limit switch being turned on.

(h) An upper end, i.e., a center portion, of the carcass C shaped into a toroidal form as described above, is in pressing contact with the tread/belt assembly held by the belt transferring apparatus. At this point, the belt transferring apparatus is returned to its standby position. A tread stitcher may also be moved so as to pressingly adhere the tread onto the carcass C (not shown)

(j) Next, the air is supplied to the inside of the left and right turn-up bladders 11, 11' respectively through the turn-up bladder air pipes 33, 34 within the main shaft 1, (see the arrows R and T). Thereby, the bladders 11, 11' are inflated. Carcass portions located outside the respective beads B, namely ply overhanging portions and sidewall portions, are turned up outwardly around the beads B by inflation of the bladders 11, 11'. Further, left and right pushers (not shown) are moved to their respective operative position so as to press the bladders 11, 11' from outside. Whereby, the ply overhanging portions and the side wall portions are pressingly adhered to the carcass C.

(k) After the pushers are withdrawn from the respective operative positions to complete the tire building operation, a green tire extracting apparatus (not shown) is moved forward up to a position corresponding to the left and the right shoulder formers 8, 8'. Upon completion of the built tire extracting operation, the green tire extracting apparatus is withdrawn and transported to a rack.

As described above, the green tire building apparatus of the invention includes a ball screw as a mechanism for sliding the left and the right shoulder formers 8, 8' relative to each other in the axial direction of the formers. Further, the main shaft 1 and the countershaft 4 are coupled to each other through a ball spline 5. Similarly, the main shaft 1 and the housing 6 are coupled to each other through another ball spline 5. Thus, frictional resistance between the screw and the nut, friction caused by rotation of the motor, and frictional resistance of the bearings can be drastically reduced. As a result, in the bead locking operation, the left and the right shoulder formers 8, 8', spontaneously following radially outward expansion of the carcass C, move uniformly and freely toward each other along the axial direction thereof. Therefore, unnaturally strong force is not be exerted on carcass ply cords, preventing the lengths of the carcass ply cords between the beads B from becoming variable. This contributes to an improvement in tire uniformity. Further, in the shaping operation, the sliding of the left and the right shoulder formers 8, 8' in the axial direction thereof and the supply of the shaping air may be synchronized to begin at the same time. The carcass ply cords are constantly subjected to the tension from the opposite sides thereof with respect to the axial direction. This results in uniform length of the carcass ply cords between the two beads and also uniform length of the turned up ply, reducing variance in circumferential length of the built green tire and preventing an occurrence of flapping of the ply. Consequently, uniformity of the tire, or tire quality can be greatly improved.

It should be noted that the present invention is not limited to the foregoing embodiment, but may also be embodied as follows:

A specific construction of the drive mechanism for moving the left and the right formers (forming means) 8, 8' is not limited to the described preferred embodiment. In addition to the ball screws 14, 14' as in the foregoing embodiment, various other devices may be substituted for the described drive mechanism.

Figure 8:
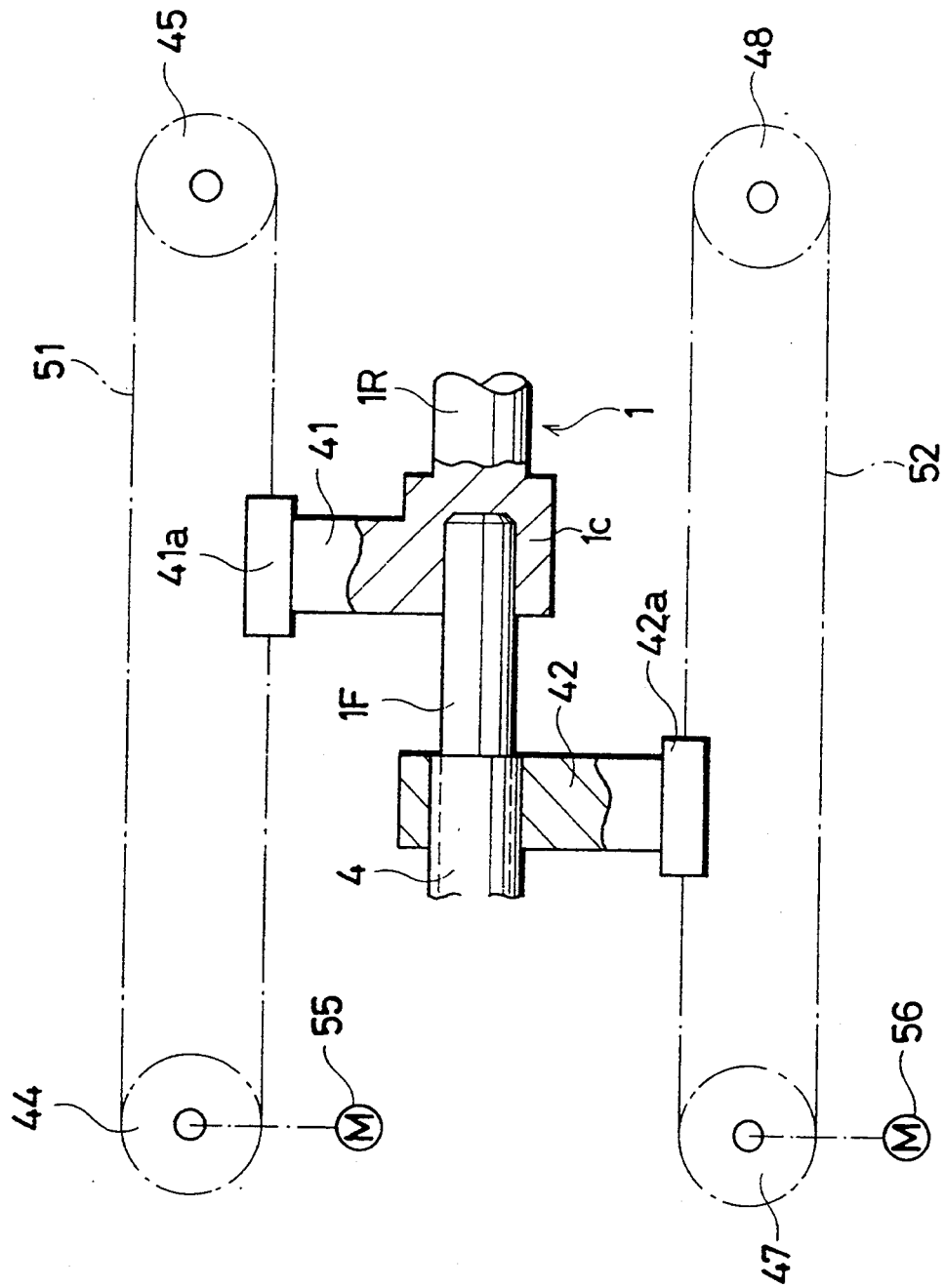
FIG. 8 is a sectional plan view showing a modified driving section in a green tire building apparatus embodying the invention.

An example of an alternative drive mechanism is shown in FIG. 8. A forward main shaft 1F and a rearward main shaft 1R are connected to each other through a connecting portion 1c. A thrust member 42 extends upward from the connecting portion 1c while another thrust member 44 is fixed to an end of the countershaft 4 extending downward. Pairs of sprockets 44–45, and 47–48 are disposed in parallel to and spaced from the main shaft 1. Each of the sprocket pair is disposed forward and rearward along the axial direction of the main shaft 1 with each the sprockets spaced from one another. The sprockets 44, 47 are coupled to respective motors (sprocket driving mechanism) 55, 56, each provided with a clutch (switch mechanism.) Upon engagement of the clutch, the sprockets 44, 47 are driven to rotate by the motors 55, 56. On one side of the main shaft 1, a chain 51 is wound on the sprockets 44–45. Similarly, on the other side of the main shaft 1, a chain 52 is wound on the sprockets 47–48. An end portion 41a of the thrust member 41 and an end portion 42a of the thrust member 42 are respectively fixed to the chain 51 and the chain 52.

With the above construction, the sprockets 44, 47 are driven to rotate by the motors 55, 56, whereby the chain 51 and the thrust member 41, and the chain 52 and the thrust member 42 can be moved integrally respectively. Thereby, it is made possible to move the main shaft 1 and the countershaft 4 in the axial direction thereof relative to each other.

In the foregoing embodiment, the clutch 12a is kept disengaged not only during the bead locking operation, but also from the start of the carcass shaping operation to a predetermined stage thereof so as to keep the left and the right shoulder formers 8, 8' in respective idle movable states. However, in the present invention, it suffices to keep the formers 8, 8' in the idle movable state at least during the bead locking operation. If so, the left and the right formers 8, 8' move freely in such directions as to be closer to each other uniformly, spontaneously following the radially outward expansion of the carcass C during the bead locking operation. This prevents the exertion of unnaturally strong forces on the carcass C and also prevent the lengths of the carcass ply cords between the beads B from becoming varied. Accordingly, uniformity of the built tire can be improved. If kept in the idle movable state from the start of the shaping operation to the predetermined stage thereof, the left and the right shoulder formers 8, 8' are movable toward each other spontaneously following inflation of the carcass by the shaping air supplied to the inside thereof. Accordingly, the sliding of the left and the right shoulder formers 8, 8' in the axial direction thereof and the supply of the shaping air can be synchronized by automatically started at the same time. In addition, the carcass ply cords are constantly subjected to a uniform tension from the opposite sides thereof with respect to the axial direction. This results in of the carcass ply cords having a uniform length between the two beads and a uniform length of the turned up ply, reducing variance in the circumferential length of the built green tire and preventing the occurrence of flapping of the ply. Consequently, uniformity of the tire can be greatly improved, resulting in a more satisfactorily built green tire.

A specific construction of green tire building mechanism is not limited to the embodiment described herein. Various apparatus can be applicable for use as building mechanism regardless of provision of a bladder.

What is claimed is:

1. An apparatus for building a green tire comprising:
a housing;
a main shaft rotatably supported by the housing;
a countershaft disposed coaxially with the main shaft, the countershaft being movable relative to the main shaft in an axial direction thereof and rotatable integrally with the main shaft;
left and right shoulder formers mounted respectively on the main shaft and the countershaft and adapted for supporting a carcass, each of the shoulder formers having radially expandable bead locking means;
drive means for moving the main shaft and the countershaft relative to each other in axial directions thereof, the drive means having a driving state of moving the main shaft and the countershaft in axial directions so that the left and right shoulder formers forcibly move to or away from each other and a suspending state of allowing the countershaft to freely move relative to the main shaft so that the left and right shoulder formers move toward each other responsive to additional tension of the carcass caused by the radially expandable bead locking means; and setting means for selectively setting the drive means in either of the driving state or the suspending state, the setting means setting the drive means in the suspending state when the radially expandable bead locking means is actuated.

2. An apparatus as defined in claim 1 wherein the countershaft includes a sleeve externally fitted to the main shaft through a ball spline.

3. An apparatus as defined in claims 3 or 4 wherein the drive means includes:
- a ball screw rotatably disposed in parallel to the main shaft and the countershaft;
- ball screw driving means for drivingly rotating the ball screw;
- a pair of nuts spirally fitted to the ball screw;
- a thrust member for coupling one of the nuts to the main shaft; and
- another thrust member for coupling the other nut to the countershaft.

4. An apparatus as defined in claims 1 or 2 wherein the drive means includes:
- first and second pairs of sprockets disposed forward and rearward relative to each other in a direction parallel to the main shaft and the countershaft, each pair being disposed on an opposite side of the main shaft and the countershaft;
- sprocket driving means for drivingly rotating the pairs of sprockets;
- first and second chains wound on the first and second pairs of sprockets respectively;
- a thrust member for coupling the first chain and the main shaft; and
- another thrust member for coupling the second chain and the countershaft.

5. A method for building a green tire on a green tire building apparatus including left and right shoulder formers arranged in an axial direction for supporting a cylindrical carcass, the shoulder formers each being provided with a bead locking mechanism and being forcibly movable in the axial direction by a driving mechanism, the driving mechanism being further selectively settable in an idle state where the two shoulder formers are freely movable toward each other in response to additional tension of the carcass caused by the bead locking mechanism, the method comprising the steps of:

- forming a cylindrical carcass on the green tire building apparatus;
- setting left and right bead rings at specified positions radially outside the respective bead locking mechanisms of the left and right shoulder formers;
- setting the driving mechanism in the idle stat so that the left and right shoulder formers are freely movable toward each other;
- actuating the bead locking mechanism to lock the bead rings on the specified positions of the cylindrical carcass while allowing the left and right shoulder formers to move to each other in response to the additional tension; and
- actuating the driving mechanism to forcibly move the left and right shoulder formers toward each other in shaping of the cylindrical carcass into a toroidal form after the bead rings are locked on the cylindrical carcass.

6. A method as defined in claim 5 wherein the driving mechanism is actuated after the bead rings are locked on the cylindrical carcass but before shaping.

7. A method as defined in claim 5 further comprising supplying shaping air into a closed space defined by the left and right shoulder formers and the carcass when the driving mechanism is in the idle state after the bead rings are locked on the cylindrical carcass, wherein the driving mechanism is actuated after the carcass is inflated to a predetermined stage.

8. A method as defined in claim 5 further comprising the steps of:
- turning up opposite side portions of the carcass around the respective bead rings after the carcass is formed into the toroidal form; and
- adhering a breaker/tread assembly onto an outer circumferential surface of the cylindrical carcass.

* * * * *